Dec. 2, 1969 D. W. NOREN 3,481,014

METHOD OF MAKING A HIGH TEMPERATURE, HIGH VACUUM PIEZOELECTRIC MOTOR MECHANISM

Filed Jan. 4, 1968 2 Sheets-Sheet 1

INVENTOR:
Don W. Noren

By Ronald M. Goldman
ATTORNEY

INVENTOR:
Don W. Noren
By Ronald M. Goldman
ATTORNEY

United States Patent Office 3,481,014

Patented Dec. 2, 1969

3,481,014

METHOD OF MAKING A HIGH TEMPERATURE, HIGH VACUUM PIEZOELECTRIC MOTOR MECHANISM

Don W. Noren, Redwood City, Calif., assignor to Litton Precision Products, Inc., San Carlos, Calif., a corporation of Delaware Filed Jan. 4, 1968, Ser. No. 696,487
Int. Cl. H04r *17/00*
U.S. Cl. 29—25.35 3 Claims

ABSTRACT OF THE DISCLOSURE

This disclosure presents a construction for piezo-electric type motor devices commonly termed "bimorphs" and obtains an improved bimorph that is suitable for operation at high temperatures and in high vacuum environments. The bimorph is constructed of two thin flat piezoelectric layers, each of which is plated on the front and back faces with an electrically conductive material by conventional techniques, such as ion plating. This plating preferably consists of successive layers of chrome, copper, and gold. One face of each element functions as an outer electrode. The middle electrode of the bimorph is a thin flat metal which has physical characteristics which match those of the piezoelectrical bodies, suitably molybdenum. The molybdenum sheet is copper plated on both sides. This electrode is sandwiched between the two piezoelectric layers. However, sandwiched between each of the piezoelectric layers and the plated middle electrode is a thin layer of electrically conductive material, suitably gold, having a waffle-like or indented lattice surface configuration. These elements are sandwiched together as indicated and are diffusion bonded together to form a unitary mass. One representative application is the use of the bimorph as a driving mechanism in tuners located within the evacuated regions of microwave tubes, such as the coaxial magnetron. Additionally, because the construction retains its operational characteristics in high vacuum environments without outgassing, the motor mechanism is suitable for application in high vacuum electron tubes and in outer space.

This invention relates to a reciprocating piezoelectric motor device of the type commonly referred to as a bimorph. More particularly, the invention relates to an improved method and construction of a piezoelectric bimorph that is suitable for operation at high temperatures and very high vacuums without breaking or cracking and without outgassing.

Conventional piezoelectric reciprocating motor mechanisms of the bimorph type consist of two layers of piezoelectric material on opposite sides of a conductive material, such as brass, and with electrodes on the outer sides of each piezoelectric body in a sandwich arrangement. The middle conductive member which forms the middle electrode is attached to a face of each of the two piezoelectric layers by conductive epoxy. Further, the outer electrodes consist of a silver paint. These elements are sandwiched together into a thin unitary mass. The operation and applications of such a piezoelectric motor device are well known and documented in the literature. Briefly, assuming the bimorph to be of a rectangular geometry with one end held fixed in a cantilever arrangement, the other end will flex or wrap to an extent proportional to the magnitude of the voltage applied between the middle and an outer layer. Alternatively, the extent of such flexure substantially increases when opposite polarity voltages are applied between the middle and each of the outer electrodes. In other applications, a signal voltage is applied only between the middle and one outer electrode to cause a bending of the bimorph while the piezoelectric material in the other half of the bimorph generates a voltage that appears between the middle and the remaining outer electrode that is proportional to the amount of flexure or bending. The application of alternating voltages to the electrodes, results in the unsupported end of the bimorph bending back and forth in synchronism with the sinusoidal variation of the input voltages. Likewise where the geometry of the bimorph is a washer-shaped disk and this disk is supported about the outer perimeter, the inner periphery thereof will move back and forth analogous to the flexure of the top of a tin can.

Applications of this function of the bimorph are numerous. It has been suggested that the reciprocating action of the bimorph be used to drive a tuning member in an R–F cavity, and that an outer conductive electrode of the bimorph functions directly as a portion of the wall of such an R–F cavity.

In applications where a tuner cavity of rapid response and capable of providing a tracking signal are desired, the tunable coaxial magnetron has been suggested an important application. The coaxial magnetron is an evacuated electron discharge device that is used to generate very high frequency electro-magnetic oscillations.

The construction of such a magnetron includes a surrounding coaxial cavity within the evacuated envelope. The size of such a cavity has a determining effect upon the frequency of the generated oscillations. Thus, tuners are constructed for the coaxial magnetron wherein a wall of this cavity is changed in position, such as to enlarge or reduce the size of the cavity, to result in a change, lowering or raising, the output frequency of the magnetron. The piezoelectric bimorph is an ideal mechanism form moving the cavity wall.

Moreover, it has been suggested that one of the outer conductive electrodes of the bimorph directly function as the cavity wall or a portion of the cavity wall. Since such electrode possesses minimal mechanical inertia and the piezoelectric material is very rapidly moved, a rapidly tuned cavity tuner is theoretically possible. In addition, as has been suggested, the voltage generated between the one of the remaining outer electrodes and the middle electrode functions as a tracking signal representative of the spontaneous frequency at which the magnetron is at that instant oscillating.

However, the conventional construction of available bimorphs includes an epoxy to bind the two piezoelectric portions to the middle electrode, and additionally includes silver paint applied to the piezoelectric layers as the outer electrodes. In this form the bimorph is unsuitable under the high temperature conditions used to bake out the magnetron during evacuation of the tube envelope. The epoxy decomposes into carbons and carbon gases. Additionally, in the vacuum environment carbon particles tend to deposit on other elements within the tube and the epoxy continues to form carbon gases. Such gassing and carbonizing not only results in eventual decomposition of the bimorph, but by destroying the vacuum, eventually materially destroys the operational characteristics of the tube. In addition, the silver paint gradually decomposed and amounts of silver deposited on the cathode of the magnetron causing the cathode to lose much of the electron emitting qualities necessary for operation of the magnetron.

To avoid the problems created by glues, epoxy, and silver paint, it is required that a bimorph be assembled without such materials. Suitably metals were found which could be plated onto the piezoelectric material and remain firmly attached. For example, successive platings of the piezoelectric material with thin layers of chrome and copper, and then by gold formed an electrode that adhered to the piezoelectric material. Moreover, in lieu of a silver middle electrode, a molybdenum sheet was found to have physical properties compatible with that of the bimorph piezoelectric materials, such as a similar rate of thermal expansion. The molybdenum was plated with copper and the copper was in turn plated with gold. The theory was that with both the middle electrode and the piezoelectric material plated with materials that were bondable by a diffusion bonding process, the elements could be joined and glues and epoxy could be avoided entirely.

However, in forming a sandwich of these elements a successful unitary mass is difficult to obtain. Because the piezoelectric material is somewhat brittle and has an uneven surface, and because metal electrodes, such as the molybdenum sheet, is relatively incompressible or rigid, as variously termed, in its surface and contains some small amounts of unevenness in its surface, the process of sandwiching the successive layers of material in the diffusion bonding process; that is, the application of a large squeezing or compressional force to the sandwiched elements in a high temperature environment, many times results in cracking of the piezoelectric layer.

In addition, since the bimorph must in operation bend or flex there must be some "give" or strain relief between the middle electrode and the abutting piezoelectric layer. In the prior art bimorphs this is accomplished by means of the epoxy which cements the middle electrode and the piezoelectric layers together. The epoxy possesses a limited flexibility. However, in the described arrangement containing the copper-gold clad molybdenum sheet, the chrome-copper-gold clad piezoelectric layers, those bimorphs which were successfully sandwiched together in the diffusion bonding process without cracking of the piezoelectric layer often failed because the bond did not permit sufficiently such "give" or resilience.

Thus, either with the rectangular shaped bimorph or the washer-shaped bimorph, the piezoelectric material often either separated from the middle electrode or simply cracked under normal bending or flexing.

Therefore, it is an object of the invention to provide an improved bimorph construction suitable for use in high temperatures and at high vacuums;

It is a further object of the invention to provide a bimorph which does not decompose or outgas in high temperatures and high vacuum environments;

It is an additional object of the invention to produce a bimorph suitable for use at high temperature and pressure without glues or epoxy that does not break or crack in use;

It is a still further object of the invention to provide a bimorph construction suitable for manufacture in a diffusion bonding process in which the piezoelectric elements do not break or crack;

And, it is a further object of the invention to provide a new method of constructing a piezoelectric bimorph device.

Briefly stated, the bimorph of the invention includes the conventional pair of thin flat layers of piezoelectric material plated on each of the front and back sides with suitable electrically conductive metal. Sandwiched in between the piezoelectric layers is a suitable metal layer or electrode of conductive material which may be plated with electrically conductive metal. Between this electrode and each of the piezoelectric layers is sandwiched a thin layer of metal that is bondable to each of the electrode and piezoelectric layers, and having a waffle-like or indented lattice surface configuration.

Further, in accordance with the invention, the metal plating of the piezoelectric body includes a layer of chrome deposited on the piezoelectric material, a layer of copper deposited on top of the chrome, and a layer of gold deposited on the copper. The middle metal electrode separating the two piezoelectric layers consists of a metal having suitable physical properties compatible with those properties of the piezoelectric material, such as molybdenum sheet. The molybdenum sheet itself is plated with a thin metal layer of copper. Moreover, the thin layer of conductive material, originally having the geometry of a waffle, preferably consists of gold.

In accordance with a further aspect of the invention, the sandwich of elements are diffusion bonded together; that is, the piezoelectric elements are compressed or pressed together under high pressure and in high temperatures. In this process the waffle-like or indented lattice configuration of the bonding layer is of course pressed or squashed, as variously termed. A union or bond is formed by the diffusion between the gold and copper layers on the piezoelectric elements and the bonding layer on one side thereof and by diffusion between the latter and the copper plating on the molybdenum sheet.

The foregoing objects and advantages and other objects and advantages are better understood from a consideration of the following descripiton taken together with the figures of the drawings, in which.

Figure 3:
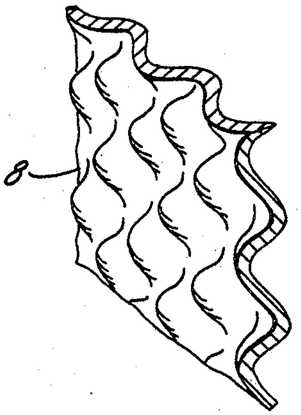

And, FIGURE 3 illustrates the shape of the bonding layer.

Figure 1:
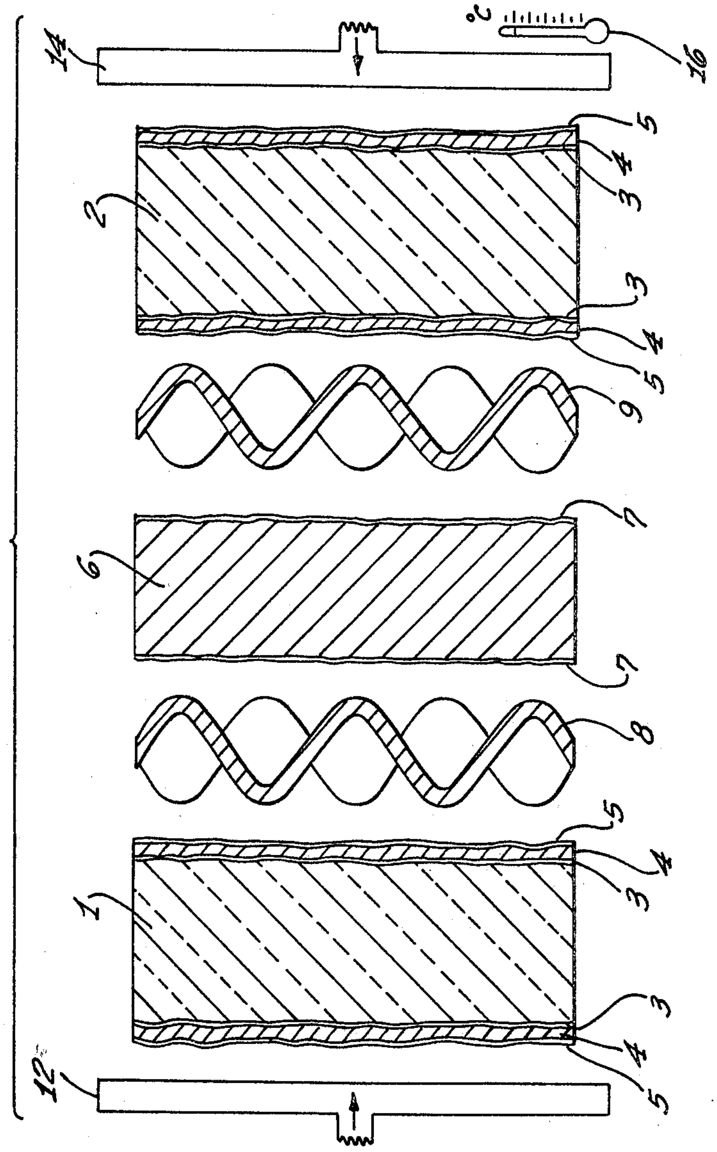
FIGURE 1 illustrates the process of the invention and the initial sandwich arrangement of the elements of the improved bimorph.

FIGURE 1 shows in cross section two washer-shaped thin flat layers or disks of piezoelectric material 1 and 2. The piezoelectric composition comprising disks 1 and 2 is of a 45–55% mixture of lead zirconate and barium titanite. Other suitable materials, such as PZT 4, PZT 5, or LTZ 1, trade designations of the piezoelectric compositions sold by the Clevite Company may be substituted. Each of piezoelectric disks 1 and 2 contain thin metal plating on the front and back faces. This plating includes a plating with the metal chrome 3. On top of chrome 3 there is a further thin metal plating of copper 4; and plated on to copper 4 is a thin layer of gold 5.

It is noted that the entire sandwich of elements which make up a bimorph is itself a thin wafer. Hence, the pictorial representation of FIGURE 1 is greatly enlarged and out of proportion in order to better illustrate the elements of the invention. Actual dimensions of a piezoelectric disk 1 or 2 in a preferred embodiment of the invention is on the order of .008". The thickness of the chrome 3 layer is between 50 to 500 angstroms; the copper 4 plating is on the order of 1000 to 2000 angstroms; and the gold 5 plating applied on top of the copper is on the order of 10 to 50 angstroms in thickness.

The metal plating of the piezoelectric material is accomplished with any suitable means. A conventional ion plating process is recommended for this purpose.

Reference is now made to the metal layer 6 which forms the middle electrode of the bimorph. Sheet 6 is for this purpose made of molybdenum inasmuch as molybdenum has physical properties, such as a rate of thermal expansion, that are compatible with the physical properties of the piezoelectric materials. Accordingly, this compatibility avoids undue thermal stresses at the bond or interface between the piezoelectric layers and the middle electrode which is caused by different rates of thermal expansion between dissimilar materials as the temperature is raised. A thin layer of copper 7 is plated on the front and back sides of the molybdenum electrode.

Sandwiched between one face of plated molybdenum electrode 6 and the plated piezoelectric disk 1 is a thin metal body or sheet 8. Likewise, sandwiched between the other face of molybdenum electrode 6 and the plated piezoelectric disk 2 is a second thin metal body or sheet 9. As is apparent from the figure, each of sheets 8 and 9 has a surface configuration which is waffle-like in nature, or, as variously termed, is of an indented lattice surface configuration. Each of metal sheets 8 and 9 preferably consists of gold.

As previously mentioned, the dimensions of the illustrated bimorph are exaggerated for purposes of illustration. Representative dimensions of these electrode, sheet and plating, are stated in order to fit the nature of the invention into its proper perspective: The molybdenum layer 6, fully plated, is on the order of .002" in thickness; the copper plating 7 is on the order of 1000 to 2000 angstrom units; and the waffle pattern of gold sheets 8 and 9 expands its thickness from .0007", the actual thickness of the gold sheet, to .0025", the maximum thickness of the sheet measured from the heighth of a protrusion on one side to the heighth of a protrusion on the other side of the sheet.

When the elements have been sandwiched together in the arrangement illustrated in FIGURE 1, it is placed in a chamber for assembling the elements together in a unitary mass. This is accomplished by a diffusion bonding process. In order to diffusion bond elements together, the elements are placed under a large compressive force and at the same time under a high temperature. This process causes compatible elements of one material to diffuse into the abutting metal, and forms a firm bond or union between the two metals. This process is schematically illustrated in FIGURE 1 by the faces 12 and 14 of a vise and thermometer 16 indicating a high temperature.

The faces 12 and 14 are brought together and compress the sandwich placing the elements under a high mechanical compression or squeezing pressure. This pressure may be on the order of 20 to 80 p.s.i. and suitably 40 pounds per square inch. The temperature to which the environment, and; hence, the bimorph sandwich is raised during this process is on the order of 600 to 650° C. After a period of time under this pressure and temperature, perhaps ½ hour, the temperature is lowered, the squeezing pressure removed, and the sandwich, now a unitary mass, is permitted to cool.

During the diffusion process the gold layer 5 and copper layer 4 diffused together and further diffuse with the gold sheet 8 on one of its sides. Moreover, on the other side, gold sheet 8 diffuses into the copper plating 7 on molybdenum sheet 6 to form the union or bond between each of those elements.

In like manner, copper layer 7 on the opposite side of molybdenum sheet 6 diffuses into one side of gold sheet 9 firmly attaching the two together and the opposite side of gold sheet 9 diffuses into copper sheet 4 and gold plating 5 on piezoelectric disk 2 forming the union therebetween.

It is apparent that during this diffusion procedure, the waffle-shaped gold sheets 8 and 9 desirably becomes somewhat pressed or flattened. Inasmuch as the piezoelectric material is both brittle, and at the small dimensions being discussed, has a relatively uneven surface, this compressibility or resiliency, or as variously termed, provides a strain relief or equalization for the piezoelectric material.

Thus, a bond is made to all parts of the plated piezoelectric surface without causing the cracking or breaking which otherwise occurs when attempting to join a brittle uneven surface to a rigid uneven surface, such as the molybdenum sheet 6, under the large compressive pressures applied during a diffusion bonding process. Moreover, even though pressed or flattened there is remaining some flexural ability or compressibility in waffle pattern gold sheets 8 and 9 which permits some "give" between the plated piezoelectric sheet disk 1 and the plated molybdenum electrode 6 as it is flexed back and forth in use.

Thus, in the completed bimorph, strains at the union or bond between the electrode 6 and the piezoelectric layer 1 in this construction are minimized.

Figure 2:
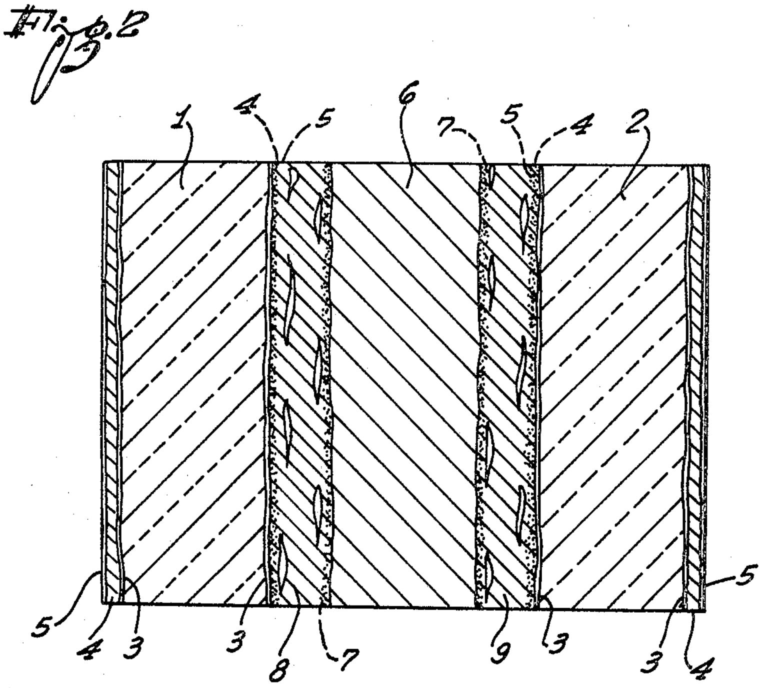
FIGURE 2 illustrates a schematic cross section, greatly enlarged, of the bimorph after completion of the bonding process.

FIGURE 2 illustrates in cross section, schematically, the diffusion bond between the elements in the unitary mass forming the completed bimorph. In this figure the like numbered elements are the elements corresponding to those same elements in FIGURE 1 and are identically labeled.

After completion of the described assembly, the piezoelectric material is electrically polarized in the conventional manner. This is accomplished; for example, by running an electrical current in one direction between an outer and middle electrode of the bimorph to polarize one piezoelectric element therein, and running an electrical current in the opposite direction between the middle and the other outer electrode of the bimorph to polarize the other piezoelectric element therein.

FIGURE 3 illustrates the waffle or indented lattice pattern of gold sheets 8 and 9 used in the construction and process of FIGURES 1 and 2.

Since the use of carbonaceous epoxy material is avoided in the invention, the bimorph does not emit carbon gases even though it is installed for operation in a high temperature and high vacuum environment, such as found in electron discharge devices. Likewise, avoiding silver paint permits the bimorph to be installed within electron discharge devices without causing poisoning or deterioration of the electron emitting cathodes found therein.

Suitably the collapsible metal layer used in the process as exemplified by the indented lattice surface configuration permits the use of the diffusion bonding process to bond the sandwich together without undesirable glues or epoxy and without cracking the piezoelectric layer. Moreover, during the use of the bimorph the same collapsible layer even though distorted still permits some miniscule but necessary movement between the piezoelectric material and the middle electrode to lessen the strain produced therebetween during flexing, and obviates any cracking off of the piezoelectric material.

The chrome used in the preferred embodiment is a conductive metal which is found to bond to the piezoelectric material more satisfactorily than copper; hence, the chrome is first plated on the piezoelectric material, and the copper is then plated to the chrome. The gold plated on the top of the copper prevents oxidation of the copper while the plated piezoelectric element is being stored prior to the complete assembly of the bimorph. Thus, it is noted that the chrome-copper-gold plating which is applied to each of the piezoelectric disks 1 and 2 in the preferred embodiment is merely exemplary as other suitably plating compositions made available to those skilled in the art.

Moreover, it is found that gold very readily diffuses into copper. Hence, the waffle-like sheet between the piezoelectric element and the copper plated molybdenum sheet is appropriately gold. Moreover, it has been found that the copper readily plates on molybdenum and, as previously discussed, molybdenum is desired because of its physical compatibility with the piezoelectric. However, since gold does not readily diffusion bond to molybdenum, application of copper plating first is dictated.

However, it is apparent that there exist other materials which can serve as the electrode 6; and, accordingly other elements which can be diffusion bonded between the piezoelectric layer 1 and the middle electrode 6 suggest themselves to those skilled in the art.

Accordingly, such materials may readily be substituted for those used in the preferred embodiment of this invention. However, the material or sheet, such as 8 and 9, whatever its composition, should have a surface pattern resembling an indented lattice in order to provide the strain relief between the relatively surface rigid or incompressible, as variously termed, electrode material and the brittle piezeoelectric material.

It is thus to be understood that the above described arrangements and details are intended to be illustrative of the principles of the invention, and are not intended to limit the invention in any way, since numerous other arrangements and equivalents suggest themselves to those skilled in the art which do not depart from the spirit and scope of the disclosed invention.

Accordingly, it is to be expressly understood that the invention is to be broadly construed within the spirit and scope of the appended claims.

What is claimed is:

1. The method of forming a piezoelectric bimorph device suitable for operation in a high temperature and high vacuum environment comprising the steps of: sandwiching together a first conductively plated thin layer of piezoelectric material having some surface unevenness; a first thin conductive layer having an indented lattice surface configuration; a thin conductively plated layer of electrically conductive material having some surface unevenness and rigidness; a second thin conductive layer having an indented lattice surface configuration; and a second conductively plated thin layer of piezoelectric material having some surface unevenness; and pressing together said sandwich under a large force in a high temperature environment to diffusion bond said bodies into a unitary mass.

2. The method of forming a piezoelectric device suitable for operation in high temperature and high vacuum environments comprising the steps of: sandwiching together a conductively plated thin body of piezoelectric material; a thin conductive body having a waffle-like surface configuration; and a thin plated metallic body; and applying a squeezing pressure in a high temperature environment to squeeze together said sandwich and diffusion bond said bodies together into a unitary mass.

3. The process of forming a union between a plated thin brittle piezoelectric layer having some surface unevenness and a thin plated metal body having some surface unevenness and rigidness comprising the steps of: inserting a second thin metal body between said piezoelectric body and said metal body, said second metal body having an indented lattice surface configuration; and diffusion bonding said members together.

References Cited

UNITED STATES PATENTS

| | | | |
|---|---|---|---|
| 2,150,328 | 3/1939 | Keall et al. | 310—9.7 XR |
| 2,497,665 | 2/1950 | Gravley | 310—9.7 XR |
| 2,636,134 | 4/1953 | Arons et al. | 29—25.35 XR |
| 2,877,363 | 3/1959 | Tibbetts | 310—9.7 |
| 3,188,732 | 6/1965 | Feduska et al. | 29—471.1 |
| 3,333,324 | 8/1967 | Roswell et al. | 29—497.5 |

JOHN F. CAMPBELL, Primary Examiner

R. B. LAZERUS, Assistant Examiner

U.S. Cl. X.R.

29—472.3; 310—9.7